Patented May 14, 1940

2,200,494

UNITED STATES PATENT OFFICE 2,200,494

HYDRAULIC BRAKE FLUID

Harvey R. Fife, Pittsburgh, Pa., assignor to Carbide and Carbon Chemicals Corporation, a corporation of New York No Drawing. Application November 19, 1936, Serial No. 111,682

3 Claims. (Cl. 252—5)

This invention relates to operating fluids for hydraulic brake systems, and to fluid pressure operating devices generally. More particularly it relates to modified oleaginous materials for use in pressure transferring fluids for such systems.

Certain special properties are required of pressure transmission media, and of hydraulic brake fluids in particular. Such fluids must be stable, both chemically and physically; their component parts must not react with each other under the various operating conditions of temperature and pressure; and their components must not separate out at low temperatures or vaporize at high temperatures. They must not react with the materials of which the container or exposed parts are composed, that is, they must not cause corrosion of exposed metal parts or effect any substantial swelling of rubber parts. In addition, the viscosity of such fluids should be controlled within workable limits over a wide range of temperature. While many fluids in use today meet one or more of the above requirements, no one of them satisfies all the rigorous demands imposed on these fluids in the same efficient manner as do the fluids of the present invention.

The object of this invention is to provide pressure transmission fluids which meet these rigorous qualifications. Other objects will be apparent from the following discussion.

I have discovered that when animal or vegetable oils of low solidifying points in which fatty acid esters are found, are reacted with a mixture of polyalkylene glycols, each glycol containing at least six carbon atoms in its molecule, substantially new esterified oleaginous materials are obtained. These new materials when admixed with suitable diluents provide entirely new and more efficient pressure transmission media. The above noted fatty acid esters, or non-mineral oils, when modified with monoalkyl ethers of polyalkylene glycols, such as triethylene glycol monomethyl ether, have also proven to be very desirable media for the transmission of pressure.

It is part of this invention that the above-mentioned compounds are reacted with the animal or vegetable oils in an amount in excess of that stoichiometrically required to form the monoesters of these compounds by reaction with all the available fatty acid radicals contained in the animal or vegetable oil. The reacted excess of these compounds is maintained as a miscible constituent of the reaction products which, taken as a whole, constitutes the base, or lubricating element, of the pressure transmission media.

The modification treatment of this invention is carried out in the presence of a relatively non-volatile alkaline catalyst at temperatures of from about 190° to about 220° C. for about 1½ to 2¼ hours. The heat treatment serves to alter the chemical and physical nature of the fatty acids, or the non-mineral oils of low solidifying points, in such a manner as to result in substantially true chemical stability, and at the same time to improve greatly the miscibility of the modified oil with a variety of oil-base diluents. In addition, the other required properties of fluids of this nature, such as water tolerance, moderate change in viscosity through wide ranges of temperatures, elimination of the tendency to congeal at low temperatures, and the like are greatly improved.

I have found that, while simple heat treatments with the polyglycols at atmospheric or increased pressures somewhat alter the nature of the oil, the use of a relatively non-volatile alkaline catalyst will enable the heat treatment to proceed more rapidly at atmospheric or reduced pressures, and will produce other changes in the oil not accomplished by heat treatment alone. Suitable non-volatile catalysts for the practice of this invention are sodium hydroxide, potassium hydroxide and triethanolamine, though it is understood that any relatively non-volatile catalyst can be used. By non-volatile catalyst is meant one which does not volatilize at the maximum temperature of the heat treating process.

In the following examples given to illustrate the invention, the polypropylene glycols used are a mixture of glycols obtained by the reaction of propylene glycol with propylene oxide, and each glycol contains six or more carbon atoms. Such a mixture may contain for example, substantially 95% dipropylene glycol, the remainder of the mixture being higher homologues of dipropylene glycol. Other glycols containing six or more carbon atoms, are useful in the practice of this invention. Triethylene glycol monomethyl ether is an example of a polyglycol monoether containing at least six carbon atoms in its molecule.

Example I

A mixture consisting of 31% by weight of castor oil, 67% by weight of a mixture of polypropylene glycols, and 0.2% by weight of a 36% aqueous solution of sodium hydroxide was heated for about 1¾ hours at a temperature of about 200° C. The amount of polypropylene glycol used in this example was approximately five times in excess of that stoichiometrically required to form the monoester of the glycol by reaction with all the available fatty acid radicals contained in the castor oil. This follows from the facts that castor oil is composed almost entirely of glyceryl triricinoleate having a molecular weight of approximately 932; that the polypropylene glycol is composed chiefly of dipropylene glycol having a molecular weight of 134; and that approximately 3 mols of polypropylene glycol are required in the reaction for each mol of castor oil. After this treatment, the evolution of carbon dioxide, water vapor and propylene oxide had ceased, and the mixture was then heated for another ½ hour at about 210° C. After cooling, 66 parts by weight of the modified oil was mixed with 34 parts by weight of normal butyl alcohol in order to form a fluid suitable for use in pressure transmission systems. The new fluid possessed a water tolerance 225% greater than a fluid of the same empirical composition which had not received the heat treatment described, and in other respects showed operating features decidedly superior to many fluids now in use.

Example II

A mixture of 49.5% by weight of castor oil and 49.5% by weight of triethylene glycol monomethyl ether, together with 0.1% by weight of sodium hydroxide, was heated for about 1¼ hours at temperatures of from about 190% to about 210° C. The amount of polypropylene glycol used in this example was approximately 2½ times in excess of that stoichiometrically required to form the monoester of the glycol by reaction with all the available fatty acid radicals contained in the castor oil. After this treatment, the evolution of carbon dioxide and water had ceased, and the mixture was then heated for another ½ hour at about 210° C. The water tolerance of a fluid composed of 33 parts by weight of this modified oil with 67 parts by weight of normal butyl alcohol was 150% greater than that of a fluid composed of the same percentage ratio of the identical components which had not been given the treatment described.

In this example, the proportions of the reactants are such that the triethylene glycol monomethyl ether was present in an amount 86% by weight in excess of that stoichiometrically required to react with all the fatty acid radicals present in the castor oil. This being so, the modified oil contained some unreacted polyglycol ether.

Example III

A mixture of about 34% of commercial soy bean oil and about 65% of a mixture of polypropylene glycols were heated for about 1¾ hours at temperatures of from about 205° to about 220° C. in the presence of about 0.2% of sodium hydroxide as a catalyst. The product of the reaction when diluted with equal proportions of monoethyl ether of propylene glycol formed a very effective pressure transferring medium. Diluents can be used in proportions equal to the quantity of oil, or may vary up to the ratio of one part of the modified oil to three parts of the diluent. When used in such proportions they have proven to be very effective hydraulic brake fluids.

While commercial grade soy bean oil is generally considered a member of the semi-drying class and is, as a rule, precluded from use in fields where chemical stability is required, I have found that the modification treatment of this invention serves to alter radically the nature of the oil, and makes it particularly useful in the fluids of this invention.

The new fluids of the present invention are not only compatible with well known pressure transferring media now in use rendering the new fluids particularly adaptable as replacements, but, in addition, they are also miscible with a large variety of diluents. The new fluids have an adequate water tolerance, but are not characterized by hygroscopicity which will cause separation of the components due to moisture absorption during use or storage. The decidedly improved heat stability of my new fluids is another important feature of advantage thereby promoting the efficiency and safety of the hydraulic devices in which they are used. The moderate change in viscosity of the new pressure media throughout wide ranges of temperature eliminates difficulties which might otherwise result from congelation at low temperatures or vaporization at high temperatures. This tendency to congeal is a very objectionable and dangerous feature of many present-day commercially used fluids, and it is exceedingly detrimental to safety and dependability in the use of such compositions, while vaporization of the fluids at high temperatures tends to cause vapor locking of the brake actuating mechanism. These properties insure a greater operating stability and dependability of the fluid.

The compositions provided by my invention may be diluted, or reduced in viscosity, with various diluents, without any decrease in the efficiency of the fluid. For example, the monohydric alcohols, the alkyl mono- and diethers of propylene, ethylene, and diethylene glycols may be used as diluents. Of these, normal butyl alcohol, ethylene glycol monoethyl ether, and propylene glycol monoethyl ether are particularly efficacious.

While certain particular embodiments of the invention have been disclosed, it will be understood that variations and changes may be made by those skilled in the art without departing from the intended scope of the invention as defined by the appended claims.

I claim:

1. A hydraulic brake fluid comprising a diluent and the reaction products of a polyalkylene glycol monoalkyl ether containing at least six carbon atoms in the polyglycol radical with a vegetable oil of the group consisting of castor oil and soy bean oil, said reaction being carried out at an elevated temperature and in the presence of small amounts of an alkaline catalyst and characterized by the use of a stoichiometric excess of said polyalkylene glycol monoalkyl ether so that the reaction products consist essentially of fatty acid esters of said polyalkylene glycol monoalkyl ether and unreacted polyalkylene glycol monoalkyl ether.

2. A hydraulic brake fluid comprising a diluent and the reaction products of castor oil with a polyalkylene glycol monoalkyl ether containing at least six carbon atoms in the polyglycol radical, said reaction being carried out at an elevated temperature and in the presence of small amounts of an alkaline catalyst and characterized by the use of a stoichiometric excess of said polyalkylene glycol monoalkyl ether so that the reaction products consist essentially of fatty acid esters of said polyalkylene glycol monoalkyl ether and unreacted polyalkylene glycol monoalkyl ether.

3. A hydraulic brake fluid comprising butanol and the reaction products of triethylene glycol monomethyl ether with castor oil, said reaction being carried out at an elevated temperature and in the presence of small amounts of an alkaline catalyst and characterized by the use of a stoichiometric excess of triethylene glycol monomethyl ether so that the reaction products consist essentially of fatty acid esters of triethylene glycol monomethyl ether and unreacted triethylene glycol monomethyl ether.

HARVEY R. FIFE.